(12) United States Patent
Obot et al.

(10) Patent No.: US 11,124,883 B2
(45) Date of Patent: *Sep. 21, 2021

(54) METHOD FOR INHIBITING METAL CORROSION USING A BENZIMIDAZOLE-CONTAINING COMPOSITION

(71) Applicant: KING FAHD UNIVERSITY OF PETROLEUM AND MINERALS, Dhahran (SA)

(72) Inventors: Ime Bassey Obot, Dhahran (SA); Saviour A. Umoren, Dhahran (SA); Zuhair M. Gasem, Dhahran (SA)

(73) Assignee: KING FAHD UNIVERSITY OF PETROLEUM AND MINERALS, Dhahran (SA)

( * ) Notice: Subject to any disclaimer, the term of this patent is extended or adjusted under 35 U.S.C. 154(b) by 0 days.

This patent is subject to a terminal disclaimer.

(21) Appl. No.: 16/389,160

(22) Filed: Apr. 19, 2019

(65) Prior Publication Data
US 2019/0284705 A1  Sep. 19, 2019

Related U.S. Application Data

(63) Continuation of application No. 15/600,202, filed on May 19, 2017, now Pat. No. 10,323,327.

(51) Int. Cl.
| | |
|---|---|
| C09K 8/54 | (2006.01) |
| C23F 11/14 | (2006.01) |
| C09K 8/04 | (2006.01) |
| C23F 11/10 | (2006.01) |
| C23F 11/16 | (2006.01) |
| C09K 8/52 | (2006.01) |

(52) U.S. Cl.
CPC .............. *C23F 11/149* (2013.01); *C09K 8/04* (2013.01); *C09K 8/54* (2013.01); *C23F 11/10* (2013.01); *C23F 11/161* (2013.01); *C09K 8/52* (2013.01); *C09K 2208/32* (2013.01)

(58) Field of Classification Search
CPC ... C09K 8/72; C09K 8/74; C09K 8/86; C09K 2208/32; C09K 8/528; C09K 8/52; C09K 8/035; C09K 8/68; C09K 8/94; C09K 8/536; C09K 8/54; C09K 8/70; C09K 8/703; C09K 8/725; C09K 8/76; C09K 2208/20; C09K 2208/28; C09K 8/04; C09K 8/60; C09K 8/607; C09K 8/64; C09K 8/82; C09K 8/92
See application file for complete search history.

(56) References Cited

U.S. PATENT DOCUMENTS

| | | | |
|---|---|---|---|
| 9,434,911 B2 | 9/2016 | Bennett et al. | |
| 2013/0264060 A1* | 10/2013 | De Wolf | C09K 8/528 166/305.1 |
| 2016/0272818 A1 | 9/2016 | Morris | |

OTHER PUBLICATIONS

Claudriana et al, "A comparative study of albendazole and mebendazole-induced, time-dependent oxidative stress", Redox Report, vol. 9, 2004, pp. 89-95.*
Zhang et al "The corrosion inhibition of copper in hydrochloric acid solutions by a tripeptide compound", Corrosion Science, vol. 513 , 2009, pp. 2349-2354.*
Zhang et al, "Inhibition of carbon steel corrosion in phase-change-materials solution by methionine and proline", Corrosion Science, vol. 111, 2016, pp. 675-689.*
Ahamad et al, "Electrochemical and Quantum Chemical Study of Albendazole as Corrosion Inhibitor for Mild Steel in Hydrochloric Acid Solution", Int. J. Electrochem. Sci, vol. 7, 2012, 34-36-3452.*
Ahamad et al, "Mebendazole: New and efficient corrosion inhibitor for mild steel in acid medium", Corrosion Science, 52, 2010, pp. 651-656.*
Hong Shi, et al., "Electrochemical and Theoretical Studies of 1-Alkyl-2-substituted Benzimidazoles as Corrosion Inhibitors for Carbon Steel Surface in HCl Medium", Chinese Journal of Structurnal Chemistry, vol. 35, Issue 12, 2016, pp. 1829-1839.
Maryann Dehdab, et al., "Theoretical study of inhibition efficiencies of some amino acids on corrosion of carbon steel in acidic media: green corrosion inhibitor", Amino Acids, vol. 48, Issue 1, Jan. 2016, pp. 291-306 (Abstract only).
Ingrid Milošev, et al., "Effect of Mercapto and Methyl Groups on the Efficiency of Imidazole and Benzimidazole-based Inhibitors of Iron Corrosion", Acta. Chem. Slov., vol. 63, No. 3, 2016, pp. 544-559.
International Search Report and Written Opinion dated Aug. 22, 2018 in PCT/IB2018/053477, 15 pages.
Locatelli, C. et al. "A comparative study of albendazole and mebendazole-induced, time-dependent oxidative stress", Redox Report, vol. 9, No. 2, XP055499539, 2004, pp. 89-95 (with cover page).
Zhang, D-Q. et al. "The corrosion inhibition of copper in hydrochloric acid solutions by a tripeptide compound", Corrosion Science, vol. 51, XP026565285, 2009, pp. 2349-2354.
Zhang, Z. et al. "Inhibition of carbon steel corrosion in phase-change-materials solution by methionine and proline", Corrosion Science, vol. 111, XP029691064, 2016, pp. 675-689.

(Continued)

*Primary Examiner* — Kumar R Bhushan
(74) *Attorney, Agent, or Firm* — Oblon, McClelland, Maier & Neustadt, L.L.P.

(57) ABSTRACT

Corrosion inhibiting compositions and methods of inhibiting corrosion on a metal surface commonly used in the petroleum industry is disclosed. The corrosion inhibitor includes at least one azole, at least one polypeptide derived from amino acid, at least one intensifier preferably from metal halides, and at least one surfactant. The methods include combining effective amounts of the corrosion inhibitor composition and contacting a metal surface in aqueous environment commonly found in oil and gas industry. The composition is very effective against corrosion of metals in contact with aqueous media when used in a dosage as low as 50 ppm.

10 Claims, 4 Drawing Sheets

(56) References Cited

OTHER PUBLICATIONS

Ahamad, I. et al. "Electrochemical and Quantum Chemical Study of Albendazole as Corrosion Inhibitor for Mild Steel in Hydrochloric Acid Solution", International Journal of Electrochemical Science, vol. 7, XP055499777, 2012, pp. 3436-3452.

Ahamad, I. et al. "Mebendazole: New and efficient corrosion inhibitor for mild steel in acid medium", Corrosion Science, vol. 52, XP026819772, 2010, pp. 651-656.

Umoren, S.A. et al. "Synergistic corrosion inhibition effect of metal cations and mixtures of organic compounds: A Review", Journal of Environmental Chemical Engineering, vol. 5, XP055499726, 2017, pp. 246-273.

* cited by examiner

METHOD FOR INHIBITING METAL CORROSION USING A BENZIMIDAZOLE-CONTAINING COMPOSITION

CROSS-REFERENCE TO RELATED APPLICATIONS

The present application is a Continuation of Ser. No. 15/600,202, now allowed, having a filing date of May 19, 2017.

BACKGROUND

Field of the Invention

The invention is directed to corrosion inhibitors especially those useful in the oil and gas industry and in the drilling profession.

DESCRIPTION OF RELATED ART

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present invention.

The annual cost of corrosion worldwide was estimated at S 2.2 Trillion in 2010, which is about 3% of the world's gross domestic product (GDP) of $73.33 Trillion (Al Hashem, A. Corrosion in the Gulf Cooperation Council (GCC) states: statistics and figures, in Proceedings of the Corrosion UAE, Abu Dhabi, UAE, 2011). Corrosion can build up in wellbore tubulars and other downhole components causing considerable damage to the life of a well in an oil or gas oilfield. Corrosion mitigations costs the oil and gas industries millions of dollars yearly.

One of the most practical and cost effective approaches in mitigation of aqueous corrosion in oil and gas industry is through use of chemical agents called corrosion inhibitors. In this context, the treatment of mild steel in oilfield corrosive environment, containing corrosive molecules such as $H^+$, $CO_2$, $H_2S$, $H_2O$ and $Cl^-$, using organic compounds has resulted in considerable savings to the oil and gas industry.

The development of corrosion inhibitors for the oil industry occurred mainly in 1940s and 1950s (Harrop, D. Chemical inhibition in demanding environment: Assuring continuing asset integrity through best practice deployment. Corrosion Management in Upstream Oil and Gas. Aberdeen, 2004). In the mid-1940s, long-chain polar compounds were shown to have inhibitive properties. This discovery dramatically altered the inhibitor practices in primary production oil and gas wells. It permitted operation of wells, where entire reservoirs would have otherwise to be abandoned because of the corrosivity and volume of water produced along with the hydrocarbons.

In the patent literature, inhibitor composition used in the oil and gas wells include a number of nitrogen-containing compounds, such as amines, imidazolines, amides and quaternary ammonium salts, often in combination with other types of inhibitors, including alkoxylated phosphate esters, intensifiers and surfactants. These inhibitors adsorb on the metal surface by forming a film. Examples of such film-forming inhibitors may be found in the following U.S. Patents and Patent Publications: U.S. Pat. Nos. 7,057,050 B2, 8,741,390, 8,618,027 B2, EP 1457 585 A1, EP 1333108 A2, U.S. Pat. Nos. 3,077,454, 4,209,418, 5,393,464, 5,779,938, US 2011/0040126 A1, and US 2016/0115598 A1.

The basic types of currently used commercial corrosion inhibitors have long chain hydrocarbons (usually C-18), as diamines or imidazolines. Although these inhibitors had met with varying success under demanding conditions encountered in offshore oil production operations, increasing environmental concerns due to their highly toxic natures have put additional constraints on their use (Singh, W. P. Bockris, J. O'M. Toxicity issues of organic corrosion inhibitors: Applications of QSAR model, The NACE International Annual Conference and Exposition, USA, 1996). Toxicity issues of organic corrosion inhibitors: Applications of QSAR model, The NACE International Annual Conference and Exposition, USA, 1996.).

This is due to the fact that the long alkyl chains have been known to increase the toxicity of imidazolines. Furthermore, imidazolines formulations have been shown to aggravate localized corrosion by creating a number of micro-anodes, leading to local anode dissolution (Tan, Y. Mocerino, M. Paterson, T. Organic molecules showing the characteristics of localized corrosion aggravation and inhibition Corrosion Science 53 (2011) 2041-2045). As a result, pitting corrosion occurs on pipelines when imidazoline inhibitors are added to the fluid (Liu, X. Okafor, P. C. Zheng, Y. G. The inhibition of $CO_2$ corrosion of N80 mild steel in single liquid phase and liquid/particle two-phase flow by aminoethyl imidazoline derivatives, Corrosion Science 51 (2009) 744-751).

With these and other objectives in mind, the inventors diligently sought an environmentally friendly, cost-effective, high-performance, easily scalable anti-corrosion composition. As disclosed herein, one way to overcome the problems and drawbacks of conventional corrosion inhibitors is to use novel azoles and polypeptide amino acid formulations having remarkable corrosion inhibiting properties despite the absence of long alkyl chains in their structure. As shown herein, in many embodiments, the azoles and polypeptides selected in this present invention do not have long alkyl chains, are naturally occurring, and are environmentally benign.

Improving the effectiveness and efficiency of oil field corrosion inhibitors by using environmentally friendly compositions, can undoubtedly save the oil and gas industry millions of dollars per year in chemicals and lost production and also protect the environment from pollution. It is an object of the present invention to provide ecofriendly corrosion inhibitor composition which is effective in preventing corrosion of metals in contact with metal surface in aqueous environment commonly found in oil and gas industry even when used in ppm levels.

BRIEF SUMMARY OF THE INVENTION

The invention relates to the use of an environmentally friendly composition as corrosion inhibitor to prevent metals in contact with aqueous fluids common in oil and gas industries from corroding. The corrosion inhibitor includes at least one azole, at least one polypeptide derived from amino acid, at least one intensifier preferably a metal halide, and at least one surfactant.

The invention will serve as a replacement for toxic long alkyl chain imidazoline compositions currently in used in the oil and gas industries. Corrosion inhibitors containing these long alkyl chain compounds makes their use risky and undesirable and the subsequent disposal of effluents containing them problematic as they contaminate water and cause serious water pollution problems.

The metals that can be protected from corrosion by the corrosion inhibitors and corrosion inhibiting methods the present invention include API 5L X Grade steels such as X52, X56, X60, X65, X70 to X120, N-80, J55, P-110, T-95, C1018, QT 800, HS80, and other common oil field alloys such as 13Cr, 25Cr, Inconel 825 and 316 L. Such inhibitors may be employed in the metallurgical, drilling, petrochemical, oil and gas, and oil servicing industries and can be effective at inhibiting corrosion at concentrations as low as 50 ppm.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 1A, 1B, 1C and 1D. LPR plots for API 5L X60 steel in $CO_2$-saturated 3.5% NaCl without and with different corrosion inhibitor formulations at 50° C. FIG. 1A (blank, control), FIG. 1B (Commercial inhibitor), FIG. 1C (Formulation A), FIG. 1D (Formulation D).

DETAILED DESCRIPTION OF THE INVENTION

Definitions

The term "azole" as used herein is given its conventional meaning of a five-membered heterocyclic compound containing a nitrogen atom and at least one other non-carbon atom.

A substituted azole may contain a carboxylic, amide, thiol, aromatic carbonyl group, or other chemical substituents.

Azoles include:

Preferably, an azole for incorporation into a composition according to the invention will have the following benzimidazole core structure:

In some embodiments, a benzimidazole component of the invention will not have hydrophobic substituents, such as alkyl or other hydrocarbyl substituents, for example, it will be free of C1, C2, C3, C4, C5, C6, C7, C8, C9, C10, C11, C12, or >C12 linear, branched or cyclic hydrocarbyl substituents or such substituted hydrocarbyl substituents.

Preferably, this core structure will be substituted with only polar or water soluble substituents that do not reduce the water solubility of a benzimidazole component or render it substantially insoluble in water. These water soluble or polar groups increase the water solubility of the benzimidazole and reduce its hydrophobicity and can reduce the toxicity of this component compared to benzimidazoles having long chain alkyl substituents.

The absence of such hydrophobic groups on the core structure of the azole component render it less toxic and permit it to synergistically interact with the other components of an anticorrosion composition of the invention, thus providing a more environmentally friendly corrosion inhibitor that is effective at very low concentrations.

In preferred embodiments, a benzimidazole component of the invention will conform to the core structure below:

Preferred substituents for R1 in the structure above are a thiol group, amine group, a substituted amine group, an amine-bearing group, such as methylamine or ethylamine, carboxylate group, amide group containing one or more aromatic groups, pyridyl group, azo group, nitrile group, alkylthio group, such as methylthio or ethylthio, 2-piperazino group, 2-bromophenyl group, sulfonic acid group, mercapto group, halogen groups, or other substituents having the same or similar degree of hydrophilicity as those recited above for R1.

Preferred substituents at R2 include a carboxylate group, thiol group, aromatic carbonyl group, hydroxy group, alkyl amino group, such as methylamine or ethylamine, amide group, or ester group or other substituents having the same or similar degree of hydrophilicity as those recited above for R2.

In some preferred embodiments, the azoles used in the present invention are those commonly used for medicinal purposes or which are components of biological, chemical and pharmaceutical products, especially those already regarded as non-toxic, cheap and environmentally friendly.

In other preferred embodiments, an benzimidazole component of a composition according to the invention will have a water solubility that is about the same or greater than that of unsubstituted benzimidazole which is about 20 g/L at 20° C. according to DrugBank (https_www.drugbank.ca/drugs/DB02962; last accessed May 9, 2017; incorporated by reference). In other preferred embodiments, an azole component of the invention will exhibit a water solubility that is about the same as the substituted benzimidazoles described by Padia, et al., U.S. Pat. No. 5,958,950 or Duyfjes, U.S. Pat. No. 4,160,029 both of which are incorporated by reference.

Criteria for inhibitor acceptance include: biodegradability (>60, 70, 80, 90, 95% for 28 days), marine toxicity (Effective Concentration, 50% (EC50)/Lethal Dose, 50% (LD50) >50, 40, 30, 30, 20 10 mg/L to North Sea species) and bioaccumulation (Log Octanol/Water Partition Coefficient (Pow)<3) (Pow=partition coefficient in octanol/water). A molecule which fulfills two of these three criteria and its biodegradability is >20, 30, 40, 50, 60, 70, 80, 90 or 95% in 28 days can be considered as green and listed on the PLONOR (pose little or no risk) list; see A. Ketsetzi, A. Stathoulopoulou, and K. D. Demadis, Being 'green' in chemical water treatment technologies: issues, challenges and developments, Desalination, 223 (1-3) (2008), 487-493 and D. Hasson, H. Shemer, and A. Sher, State of the Art of Friendly 'Green' Scale Control Inhibitors: A Review Article, Ind. Eng. Chem. Res., 50 (12) (2011) 7601-7607 both of which are incorporated by reference. For example, an azole or benzimidazole component according to the invention may be >60% biodegradable over 28 days, have a bioaccumulation based on Pow <3, and have an EC50 or LC50>10 mg/L to North Sea species.

The azoles and polypeptides used in the composition according to the invention generally met at least two of the three requirements according to ACD/Percepta 14.1.0 software for predicting LD50 and LogPow of organic compounds license to Center of Research Excellence in Corrosion at KFUPM: marine toxicity (Effective Concentration, 50% (EC50)/Lethal Concentration or 50% (LC50) >10, 20, 30, 40, or 50 mg/L to North Sea species) and bioaccumulation (Log Octanol/Water Partition Coefficient (Pow)<3) (Pow=partition coefficient in octanol/water).

In some embodiments, a composition according to the invention will contain about 0.001 to 10 wt % of at least one benzimidazole, preferably from about 0.01 to 5 wt %, and most preferably from about 0.05 to 2 wt %. These ranges include all intermediate values and subranges, such as 0.001, 0.002, 0.005, 0.01, 0.02, 0.05, 0.1, 0.2, 0.5, 1.0, 2.0, 5.0 or 10.0 wt %.

"Surfactant" is assigned its conventional meaning as a compound that lowers the surface tension (or interfacial tension) between two liquids or between a liquid and a solid and which can act as detergents, wetting agents, emulsifiers, foaming agents, and dispersants. Suitable surfactants include, but are not limited to, anionic surfactants, cationic surfactants, amphoteric (zwitterionic) surfactants, and nonionic surfactants. Anionic surfactants include alkyl aryl sulfonates, olefin sulfonates, paraffin sulfonates, alcohol sulfates, alcohol ether sulfates, alkyl carboxylates and alkyl ether carboxylates, and alkyl and ethoxylated alkyl phosphate esters, and mono and dialkyl sulfosuccinates and sulfosuccinamates. Cationic surfactants include alkyl trimethyl quaternary ammonium salts, alkyl dimethyl benzyl quaternary ammonium salts, dialkyl dimethyl quaternary ammonium salts, and imidazolinium salts. Nonionic surfactants include alcohol alkoxylates, alkylphenol alkoxylates, block copolymers of ethylene, propylene and butylene oxides, alkyl dimethyl amine oxides, alkyl-bis(2-hydroxyethyl) amine oxides, alkyl amidopropyl dimethyl amine oxides, alkylamidopropyl-bis(2-hydroxyethyl) amine oxides, alkyl polyglucosides, polyalkoxylated glycerides, sorbitan esters and polyalkoxylated sorbitan esters, and alkyl polyethylene glycol esters and diesters. Also included are betaines and sultanes, amphoteric surfactants such as alkyl amphoacetates and amphodiacetates, alkyl amphopropipionates and amphodipropionates, and alkyliminodipropionate.

In some preferred embodiments, the surfactant is a quaternary ammonium compound, an amine oxide, an ionic or nonionic surfactant, or any combination thereof. Suitable quaternary amine compounds include, but are not limited to, alkyl benzyl ammonium chloride, benzyl cocoalkyl (C12-C18) dimethylammonium chloride, dicocoalkyl (C12-C18) dimethylammonium chloride, ditallow dimethylammonium chloride, di(hydrogenated tallow alkyl)dimethyl quaternary ammonium methyl chloride, methyl bis(2-hydroxyethyl cocoalkyl (C12-C18) quaternary ammonium chloride, dimethyl(2-ethyl) tallow ammonium methyl sulfate, n-dodecylbenzyldimethylammonium chloride, n-octadecylbenzyldimethyl ammonium chloride, n-dodecyltrimethylammonium sulfate, soya alkyltrimethylammonium chloride, and hydrogenated tallow alkyl (2-ethylhexyl) dimethyl quaternary ammonium methyl sulfate.

"Metal halides" describe compounds comprising a metal and a halide, such as fluorine, chlorine, bromine, iodine and astatine. "Metals" preferably include alkali metals such as lithium, sodium, potassium, or rubidium; or alkali earth metals such as beryllium, magnesium, calcium, strontium or barium. Metal halides may also contain metals such as transition metals, post-transition metals, lanthanides, or actinides. "Iodine salts" include LiI, NaI, KI and RuI as well as $MgI_2$ and its hydrates and $CaI_2$ and its hydrates.

Metal hydroxides may be employed in combination with the benzimidazole and the polypeptide components of the invention (instead of a metal halide), however, metal halides, especially those comprising iodide ions are preferred because they can exhibit a greater synergy with the benzimidazole and the polypeptide components of the invention in comparison to composition containing metal hydroxides, or containing non-iodide halide ions like metal chlorides or metal bromides.

"Polypeptide" has its conventional meaning as any of a group of natural or synthetic polymers made up of amino acids chemically linked. A polypeptide incorporated into the composition according to the invention preferably comprises the following core structure:

or salts thereof.

Preferably, the R4, R5 and R6 are independently hydrogen or alkyl groups, such as methyl, ethyl, propyl, isopropyl, butyl, isobutyl, pentyl, isopentyl, etc.

One example of this kind of polypeptide is glutathione or (2S)-2-Amino-4-{[(1R)-1-[(carboxymethyl)carbamoyl]-2-sulfanylethyl]carbamoyl}butanoic acid:

Glutathione analogs may also be incorporated into the composition of the invention. These include S-octylglutathione, S-methylglutathione, S-lactoylglutathione, S-hexylglutathione, glutathionesulfonic acid, glutathione reduced ethyl ester, L-glutathione oxidized disodium salt, L-Glutathione oxidized and their derivatives, as well as those described by Lucent, et al., *Design and synthesis of glutathione analogues*, and by Fahey, *Glutathione analogs in prokaryotes*, Biochim. Biophys Acta 1830 (2013) 3182-3198, both of which are incorporated by reference. The polypeptide component(s) of the composition of the invention (e.g., glutathione and its derivatives) are important constituent antioxidants in plants and animals. These components help reduce toxicity and oxidative stress thus making the composition more friendly to plants and animals.

"Composition" refers to a single ingredient or a mixture of two or more ingredients. A composition according to the invention will generally contain at least one azole (e.g., a substituted benzimidazole as described above); surfactant (e.g., emulsifier, detergent, wetting agent, or dispersant); and a metal halide. It will usually be in combination with or in a form combinable with, water or another aqueous solvent. It may be in a premixed form in combination with water or an aqueous buffer.

It may be in the form of a kit or device containing separate components that are mixed with or incorporated into a solution (such as into an aqueous solution or a liquid containing water or corrosive agents) to produce a composition of the invention.

In some embodiments it may be prepared in a concentrated or anhydrous form that can later be mixed with, incorporated into, or injected into, water or another aqueous solution or medium. It may be in the form of a solution, emulsion, suspension, gel, unguent or lubricant. In a preferred embodiment, the composition of the invention is useful in preventing or ameliorating corrosion, especially of ferrous metals, or for removing corrosion or other deposits from systems containing components subject to corrosion.

"Metal" includes elements conventionally known as metals as well as admixtures and alloys containing different metals. A metal may exhibit a crystal structure such as a body-centered cubic (bcc), face-centered cubic (fcck), and hexagonal close-packed (hcp) structure. An "alloy" is a mixture of two or more elements in which the main component is a usually a metal. Alloys include ferrous metals and alloys of iron such as steel, stainless steel, cast iron, tool steel, and alloy steel. Iron alloyed with various proportions of carbon gives low, mid and high carbon steels, with increasing carbon levels reducing ductility and toughness. The addition of silicon will produce cast irons, while the addition of chromium, nickel and molybdenum to carbon steels (more than 10%) results in stainless steels. Alloys of aluminum, titanium and magnesium are valued for their high strength-to-weight ratios. Compositions as described herein may be used to prevent or ameliorate metal corrosion.

"Steel" as used herein describes all types of steel, including low carbon or mild steels containing up to 0.3% carbon, medium carbon steels containing more than 0.3 to 0.6% carbon, and high carbon steels containing more than 0.6% carbon. Carbon steels composed only of iron and carbon are included as well as alloy steels such as a steel containing one or more of manganese, silicon, nickel, titanium, copper, chromium or aluminum. "Stainless steels" that contain chromium as a main alloying element, for example, that contain 10-20 wt % chromium, are included. Stainless steels can be divided into three groups based on their crystalline structure austenitic steels, which are non-magnetic and nonheat-treatable and which generally containing about 18% chromium, 8% nickel, and less than 0.8% carbon; ferritic steels that contain trace amounts of nickel, 12-17% chromium and less than 0.1% carbon along with other alloying elements such as molybdenum, aluminum and/or titanium; and martensitic steels that containing 11-17% chromium, less than 0.4% nickel and up to 1.2 wt % carbon.

This term also includes tool steels that contain tungsten, molybdenum, cobalt and/or vanadium in varying quantities, for example, to increase heat resistance and durability. Tool steels are often used in applications requiring cutting or drilling, such as in drilling equipment.

Additional description of steels and stainless steels is incorporated by reference to http_www.totalmateria.com/articles/Art62.htm (last accessed May 2, 2017) and to http_www.worldstainless.org/Files/issf/non-image-files/PDF/TheStainessSteelFamily.pdf (last accessed May 2, 2017). Compositions as described herein may be used to prevent or ameliorate corrosion of steels.

"Steel-containing products" include materials used in the drilling, petroleum, oil and gas industries including drills, drill bits, pumps, compressors, pipelines, and other tools and equipment, electric parts such as transformers, power generators and electric motors, vehicle parts including those of boats, autos, trucks, aircraft, and military vehicles. Tools, including construction, automotive, household, and kitchen tools, are included. Generally, the anticorrosive composition will be contacted with, or continuously or intermittently applied to, the surfaces of such steel-containing products, preferably in a space or volume where continued contact between the steel-containing product and anticorrosive composition can be maintained or refreshed.

Steel products can also be divided by their shapes and related applications. Such products include long/tubular Products include bars and rods, rails, wires, angles, pipes, and shapes and sections. These products are commonly used in the automotive and construction sectors. Flat products include plates, sheets, coils, and strips. These materials are mainly used in automotive parts, appliances, packaging, shipbuilding, and construction. Other products include valves, fittings, and flanges and are mainly used as piping materials.

Other steel-containing products include shipbuilding equipment or materials, pipeline equipment or materials, mining equipment or materials, offshore construction equipment or materials, aerospace equipment or materials, surface or underwater drones, white goods (e.g., washing machines), heavy equipment such as bulldozers, office furniture, steel wool, tools, and armor in the form of personal vests or vehicle armor or rolled homogeneous armor. The metals and metal products, including drilling equipment, described herein may be contacted with or treated with an azole composition according to the invention to prevent corrosion.

"Drilling equipment" includes mechanical, electric, hydraulic, pneumatic and steam powered equipment. It includes cable used to raise or drop a drill bit, metal drill pipe, and coil tubing. It includes equipment or tools employed for auger drilling, percussion rotary air blast (RAB) drilling, air core drilling, cable tool drilling, reverse circulation (RC) drilling, diamond core drilling, direct push rigs and drilling equipment, hydraulic rotary drilling. Rig equipment is also included, such as centrifuges, solids control equipment, chain tongs, degassers, desander/desilter, drawworks, drill bits, drill pipes, elevators, mud motors, mud pumps, mud tanks, rotary tables, and shale shakers.

When such equipment or another steel or metal product are subject to corrosion or placed under corrosive conditions, it may be contacted with the anticorrosion composition according to the invention.

"Systems" include, but are not limited to, systems used in petroleum (e.g., crude oil and its products) or natural gas production, such as well casing, transport pipelines, drilling and other oil field applications, transport, separation, refining, storage, and other liquid natural gas and petroleum-related applications, geothermal wells, water wells; cooling water systems including open recirculating, closed, and once-through systems; cisterns and water collection or holding systems, solar water heating systems, boilers and boiler water systems or systems used in power generation, mineral process waters including mineral washing, flotation and benefaction; paper mill digesters, washers, bleach plants, white water systems and mill water systems; black liquor evaporators in the pulp industry; gas scrubbers and air washers; continuous casting processes in the metallurgical industry; air conditioning and refrigeration systems; building fire protection heating water, such as pasteurization water; water reclamation and purification systems; membrane filtration water systems; food processing streams and waste treatment systems as well as in clarifiers, liquid-solid applications, municipal sewage treatment systems; and industrial or municipal water distribution systems. In some embodiments, an azole-containing composition is used as a corrosion inhibitor to inhibit the corrosion of ferrous metals in systems exposed to corrosive molecules/ions such as $H_2O$, $H^+$, $CO_2$, $H_2S$, and $Cl^-$.

"Brine" or "Drilling Fluid" includes NaCl salt water as well as water containing other salts such as KCl, NaCl, KBr, $CaBr_2$, $CaCl_2$, ZnBr, $NaBr_2$, etc. A brine may be unsaturated or saturated with salt(s). To improve or maintain viscosity then may contain sodium bicarbonate or a viscosifier, such as hydroxyethyl cellulose (HEC). Brine or drilling fluid is usually used in completion operations and, increasingly, when penetrating a pay zone. Brines are preferred because they have higher densities than fresh water but lack solid particles that might damage producible formations. Classes of brines include chloride brines (calcium and sodium), bromides and formates. Brines include those described by http_www.geodf.com/store/files/24.pdf (last accessed May 9, 2017; incorporated by reference).

Brine temperatures can range from their freezing points to their boiling points, for example, 0, 10, 20, 30, 40, 50, 60, 70, 80, 90, 100° C. (or more or less depending on the composition of the brine) including any intermediate value or subrange. The pH of brine fluid may be acidic, neutral or basic, for example, it may have a pH of less than 5, 5, 6, 7, 8, 9, or more than 9 as well as any intermediate value or subrange.

Water admixed with brine or other drilling fluids is often disposed of by underground injection into salt-water saturated formations or by evaporation in surface pits. The reduced concentrations and toxicity of compositions of the invention advantageous reduce environmental impact of disposal of brines and other drilling fluids.

The composition of the invention is useful when metals, such as drilling equipment come into contact with brine or other corrosive drilling fluids.

Advantageously, when used in conjunction with brine or drilling fluid exposures, the composition of the invention is less toxic than other anticorrosive compositions and thus more environmentally friendly. Its use facilitates and makes safer wastewater cleanup, for example, of oil or gas field effluents in which dirty water is stripped of its solids and made suitable for recycling into a mud system or disposal into sewer systems or other places. In closed mud systems, water containing colloidal matter can be cleaned and recycled. Efficient agglomeration of colloidal solids is achieved by pH adjustment, small additions of alum or a high-molecular-weight polymer. Agglomerated solids are then filtered or centrifuged from the fluid.

"Toxicity" may be measured based on administration of an oral, dermal, inhaled amount of a compound, such as an azoleoranazole-containing composition or separate components of such a composition. Toxicity may be measured using bioassays to measure death rates in order to quantify the effect of the toxin. Such measures are commonly known as LD50 and LC50. The LD50 is defined as the lethal dose at which 50% of the population if killed in a given period of time; an LC50 is the lethal concentration required to kill 50% of the population. The LC50 is a measure, e.g. in mg/l, of the concentration of the toxin. These bioassays involve subjecting several replicate groups of individuals to a range of concentrations (or doses) of a toxic compound and measuring the mortality after a defined time interval, e.g. 24 hours, 48 hrs, 1 week, 1 month, etc. The data are then plotted and the LC50 is interpolated from the graph.

Testing may be performed using a mammal or other test animal, such as a mouse, rat, hamster, rabbit, fish, crustacean, worm, insect, or other invertebrates, a test plant, such as an aquatic plant or plant present in an environment exposed to a potentially toxic compound or composition, or a microorganism such as an bacterium.

It may also be performed using an animal-free cell-based testing method, for example, in vitro on human cells, mammalian cells, insect cells or other eukaryotic cells.

Appropriate positive and negative controls may be used during toxicity testing.

Acute toxicity looks at lethal effects following oral, dermal or inhalation exposure. It is split into five categories of severity where Category 1 requires the least amount of exposure to be lethal and Category 5 requires the most exposure to be lethal. The table below shows the upper limits for each category.

| Method of administration | Category 1 | Category 2 | Category 3 | Category 4 | Category 5 |
|---|---|---|---|---|---|
| Oral: $LD_{50}$ measured in mg/kg of bodyweight | 5 | 50 | 300 | 2 000 | 5 000 |
| Dermal: $LD_{50}$ measured in mg/kg of bodyweight | 50 | 200 | 1 000 | 2 000 | 5 000 |
| Gas inhalation: $LC_{50}$ measured in ppmV | 100 | 500 | 2 500 | 20 000 | Undefined |
| Vapour Inhalation: $LC_{50}$ measured in mg/L | 0.5 | 2.0 | 10 | 20 | Undefined |

-continued

| Method of administration | Category 1 | Category 2 | Category 3 | Category 4 | Category 5 |
|---|---|---|---|---|---|
| Dust and Mist Inhalation: $LC_{50}$ measured in mg/L | 0.05 | 0.5 | 1.0 | 5.0 | Undefined |

Preferably, the azole or other ingredients (e.g., surfactant, metal halide) incorporated into a composition according to the invention (or the composition itself) will not be toxic, for example, the LD50 of an oral or dermal dose of the azole or the azole composition would be more than 5,000 mg/kg of body weight.

Aquatic toxicity testing of aquatic organisms, such as amphibian (frogs, toads, salamanders), fish, crustacea, insects, worms, or aquatic or marsh or wetland plants (cattails, sedges, papyrus, sawgrass), animals or microorganisms (including those in freshwater, saltwater, and tidal marshes) to certain concentrations of a substance in their environment to determine the lethality level. For example, fish may be exposed for 96 hours while crustacea may be exposed for 48 hours. While table below does not define toxicity past 100 mg/l (Category 3), the EPA currently lists aquatic toxicity for such compounds as "practically non-toxic" in concentrations less than or equal to 100 ppm (100 mg/L):

| Exposure | Category 1 | Category 2 | Category 3 |
|---|---|---|---|
| Acute | ≤1.0 mg/L | ≤10 mg/L | ≤100 mg/L |
| Chronic | ≤1.0 mg/L | ≤10 mg/L | ≤100 mg/L |

Preferably, the azole incorporated into a composition according to the invention (or the composition itself) will not be toxic, for example, the LC50 would be more than 100, 200, 300, 400, 500, or 1,000 mg/L or more (or any intermediate value within this range). In some embodiments, the azole of the invention (or the azole composition per se) will be less toxic than an azole present in a conventional anti-corrosion agent. It may have an acute or chronic toxicity of greater than or equal to 10, 20, 30, 40, 50, 60, 70, 80, 90, or 100 mg/L (or any intermediate value within this range).

Additional methods and criteria useful for measuring toxicity or comparing toxicity of a compound to controls are described by Generic Ecological Assessment Endpoints (July, 2016) incorporated by reference to https_www.epa-.gov/sites/production/files/2016-08/documents/geae_2nd_edition.pdf (last accessed May 4, 2017).

The present invention includes corrosion inhibitor composition using environmentally friendly azoles, especially benzimidazoles without long chain alkyl substituents. The azole is formulated into environmentally friendly corrosion inhibitor composition that can act by forming a protective film on the metal surface or passivating the metal surface. One of the many advantages associated with the use of the corrosion inhibitor compositions is that they have the potential to be used as corrosion inhibitors in locations that are subject to environmental regulations.

The corrosion inhibitor can be used in or incorporated into aqueous fluids containing $CO_2$, $H_2S$ and chlorides and is particularly active at a very low dosage of 10 to 50 ppm in oil and gas wells.

A corrosion inhibitor according to the invention comprises:

(a) 0.01 to 5% in weight, and most preferably from 0.05 to 2% in weight of a 2, 6 substituted azoles containing carboxylic, amide, thiol and aromatic carbonyl groups, etc. The azoles used in the present invention are commonly used for medicinal purposes and are regarded as non-toxic, cheap and environmentally friendly. They often can form an important heterocyclic nucleus of many biological, chemical and pharmaceutical products. The azoles have the following structures:

where R1 is a thiol group, amine group, a substituted amine group, an amine-bearing group, such as methylamine or ethylamine, carboxylate group, amide group containing at least one aromatic group, pyridyl group, azo group, nitrile group, alkylthio group (e.g. methylthio group), 2-piperazino group, 2-bromophenyl group, sulfonic acid group, mercapto group etc. R2 is a carboxylate group, thiol group, aromatic carbonyl group, hydroxy group, alkyl amino group (e.g. methyl amino), amide group, and ester group, etc. For example, the aromatic carbonyl group in the corrosion inhibitor composition may be an alkyl benzyl carbonyl group where R3 is an alkyl group from C1-C3. The general structure is as shown below:

(b) 0.01 to 1%, preferably, 0.03 to 0.05%, of a polypeptide comprising having the general structure as shown below:

where R4, R5 and R6 are hydrogen or alkyl groups, preferably C1-C2 alkyl.

Examples of the polypeptides include: glutathione, S-octylglutathione, S-methylglutathione, S-lactoylglutathione, S-hexylglutathione, glutathionesulfonic acid, glutathione reduced ethyl ester, L-glutathione oxidized disodium salt, L-glutathione oxidized and any derivative thereof.

(c) 0.0015 to 0.01% of surfactants such as cetyl trimethyl ammonium bromide, Polysorbate 80 (Commercial name-TWEEN 80), linear alcohol ethoxylates, ethylene glycol, propylene glycol etc.

(d) 0.1 to 0.5% of iodide such as potassium iodide or sodium iodide.

(e) 50 to 90% weight of water, (f) Optionally from 5 to 10% weight of an alcohol, or glycol or mixture.

The following example illustrated various aspects of the present invention. They are not to be construed to limit the claims in any manner whatsoever.

Example

Rotating Cylinder Electrode (RCE) Corrosion Test procedure

Material tested was a API 5L X60 carbon steel cylinder measuring 10.0 mm in length and 6.0 mm diameter. Before testing, the electrode was polished to 1200 grit SIC emery paper and then cleaned with alcohol, acetone and distilled water. Inhibitors used in this work include an example of two compositions of the present invention designated as Formulation A and Formulation D and a commercially obtained imidazoline-based corrosion inhibitor formulation designated as "Commercial Inh".

Formulation A contains the following azoles:

Formulation D contains the following azoles:

All the chemicals used for the formulations of A and D were reagent grade and were obtained from Sigma Aldrich, USA. The commercial inhibitor formulation was used for comparison only. The concentration of the inhibitors used was 50 ppm.

Testing solution consists of 3.5% NaCl solution, heated, de-aerated by purging with CO2 gas during 2 hours prior the experiment and kept bubbling throughout the experiment. At these saturation conditions, the pH was 3.8. The pH was adjusted to 5 using $NaHCO_3$ to mimic oil field brine condition.

The rotating speed of the cylindrical specimen was adjusted to 1,000 rpm to produce a specific shear stress equivalent to turbulent flow conditions using RCE assembly from Gamry. Corrosion tests were conducted after 6 hours of immersion of the carbon steel and the temperature kept at 50° C.

Electrochemical techniques employed included linear polarization resistance, LPR and electrochemical impedance spectroscopy, EIS. LPR experiments were done from −15 to +15 mV versus $E_{corr}$ at the scan rate of 0.125 mVs-1. EIS measurements were carried out under potentiostatic conditions in a frequency range from 100 kHz to 10 mHz, with amplitude of 5 mV peak-to-peak, and 5 points/decade were recorded using AC signal at $E_{corr}$. Measurements were obtained by using a conventional three electrodes glass cell with a graphite electrodes and a saturated calomel electrode (SCE) as reference with a Lugging capillary bridge. All experiments were performed in one-compartment cell with three electrodes connected to Gamry Instrument Potentiostat/Galvanostat/ZRA (Reference 3000) with a Gamry framework system based on ESA410. Gamry applications include software DC105 for corrosion, EIS300 for EIS measurements and Echem Analyst 6.0 software package for data fitting. The % protection of the carbon steel surface by the tested inhibitors formulations was evaluated using polarization resistance ($R_p$). The % protection efficiencies for LPR and EIS measurements are given by the following:

$$(\%\ Protection_{LPR}) = 1 - \frac{R_p}{R_p^o} \times 100 \qquad (1)$$

$$(\%\ Protection_{EIS}) = \frac{R_p - R_p^o}{R_p} \times 100 \qquad (2)$$

Where: Rp is the polarization resistance of the inhibited formulated and R°p is the polarization resistance of the Blank (uninhibited solution).

Electrochemical studies were carried out in accordance with the requirements of the ASTM standards which are incorporated by reference:

(a) ASTM G3-89(2010), Standard Practice for Conventions Applicable to Electrochemical Measurements in Corrosion Testing, ASTM International, West Conshohocken, 2010.

(b) ASTM G59-97(2009), Standard Test Method for Conducting Potentiodynamic Polarization Resistance Measurements, ASTM International, West Conshohocken, 2009.

(c) ASTM G102-89(2010), Standard Practice for Calculation of Corrosion Rates and Related Information from Electrochemical Measurements, ASTM International, West Conshohocken, 2010.

(d) ASTM G106-89 (2010), Standard Practice for Verification of Algorithm and Equipment for Electrochemical Impedance Measurements, ASTM International, West Conshohocken, 2010.

(e) ASTM NACE/ASTM G193-12a, Standard Terminology and Acronyms Relating to Corrosion, ASTM International, West Conshohocken, 2012.

Figure 1A:
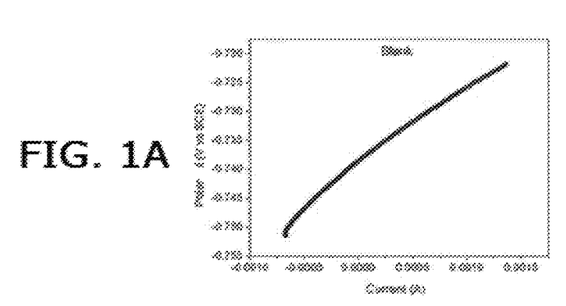
Figure 1B:
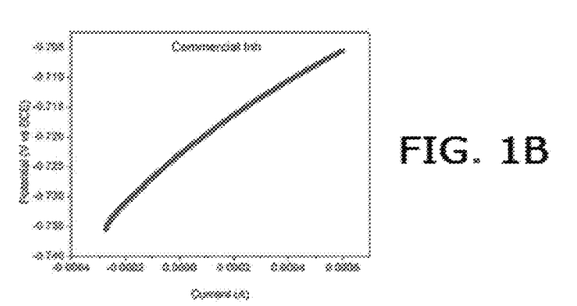
Figure 1C:
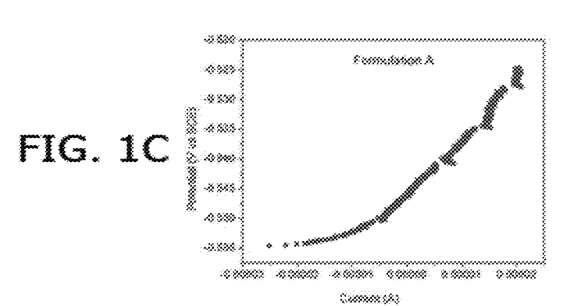
Figure 1D:
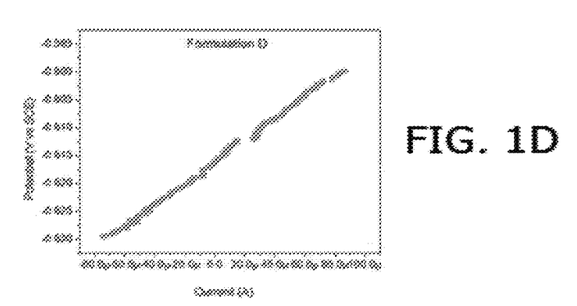
Figure 2A:
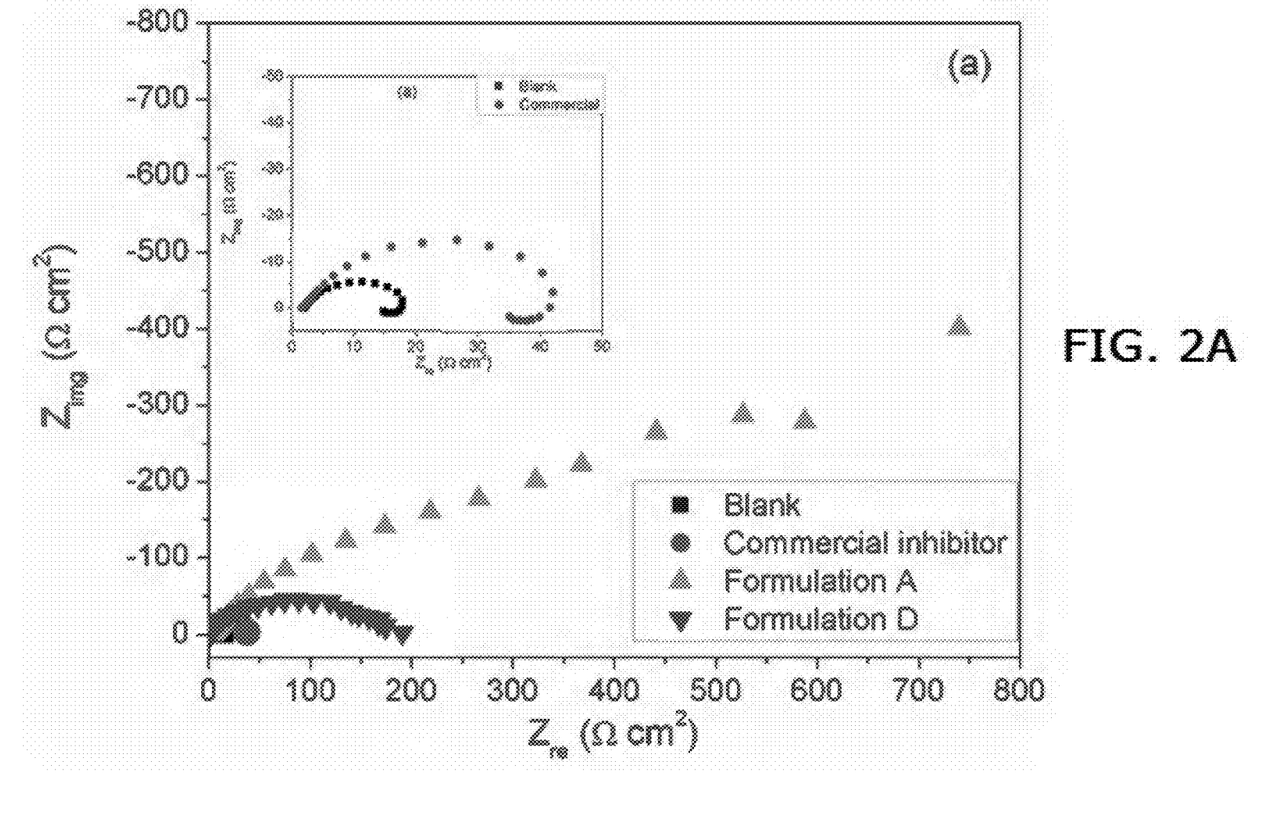
FIGS. 2A and 2B. Impedance plots for API 5L X60 steel in $CO_2$-saturated 3.5% NaCl without and with different corrosion inhibitor formulations at 50° C. in (FIG. 2A) Nyquist and (FIG. 2B) Bode modulus representations.
Figure 2B:
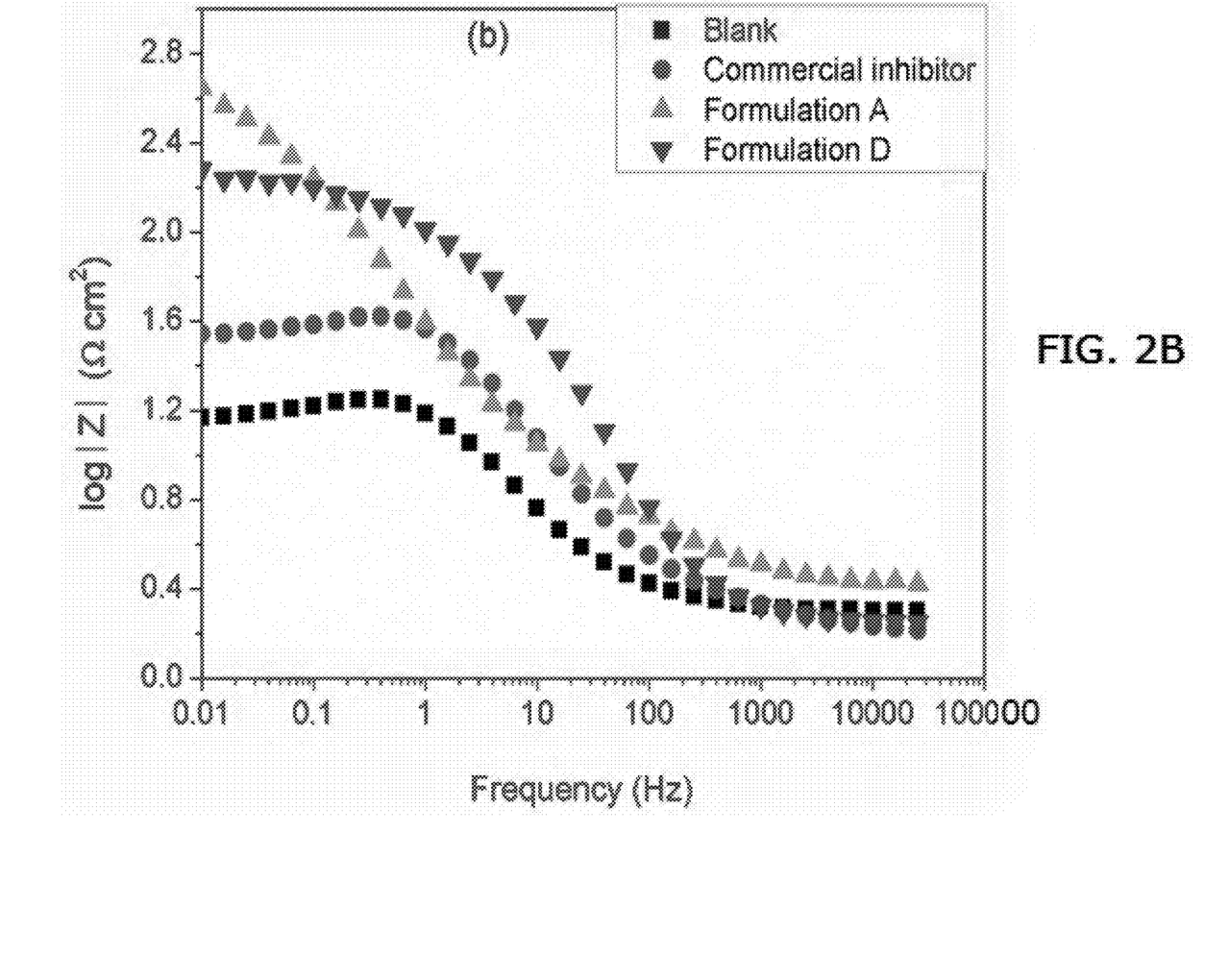
Figure 3A:
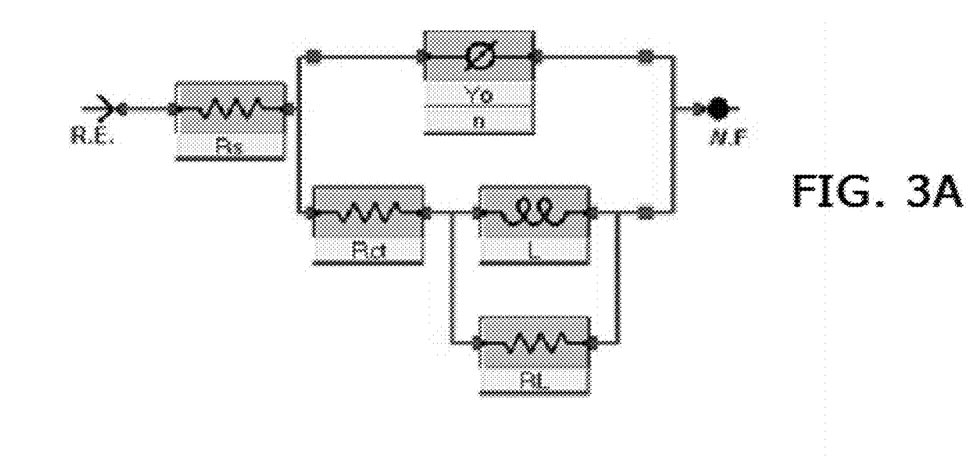
FIGS. 3A and 3B. Equivalent circuit used to fit (FIG. 3A). Blank and commercial inhibitor and (FIG. 3B) formulations A and D.
Figure 3B:
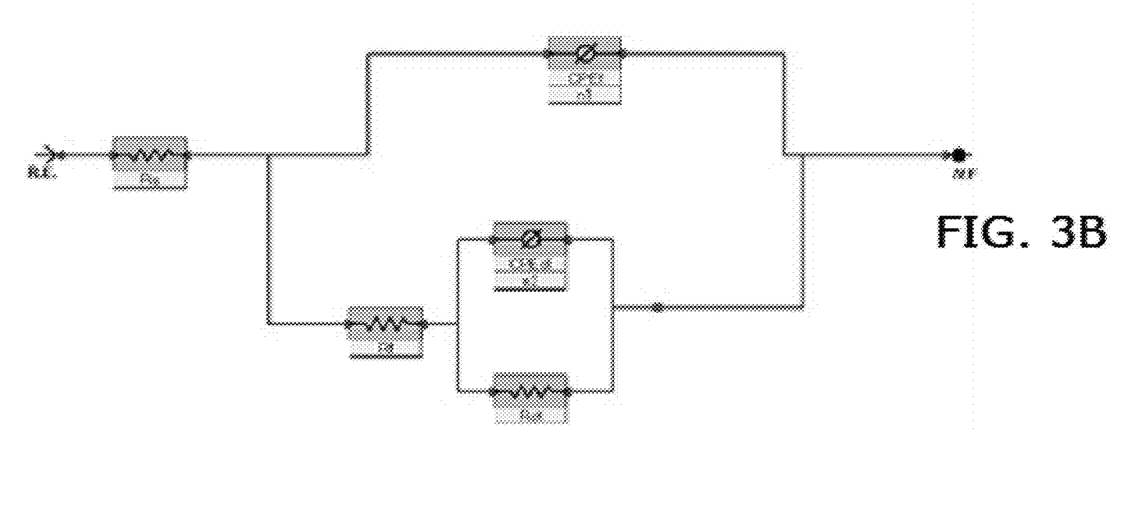

FIGS. 1 and 2 show the results of the LPR and EIS measurements. FIG. 3 shows the equivalent circuits used in fitting the EIS data. Table 1 depicts the composition of corrosion inhibitor formulation A and D.

TABLE 1

COMPOSITION OF CORROSION INHIBITOR

| Corrosion inhibitor formulations | Weight % | |
|---|---|---|
| | A | D |
| Azoles | 0.1 | 0.1 |
| Polypeptides from amino acid | 0.05 | — |

TABLE 1-continued

COMPOSITION OF CORROSION INHIBITOR

| Corrosion inhibitor formulations | Weight % A | Weight % D |
|---|---|---|
| Metal iodide | 0.16 | 0.16 |
| Surfactants | 0.015 | 0.015 |
| Water | 90 | 89.10 |
| Alcohol (optional) | 9.7 | 9.7 |
| Initial pH | 3.35 | 9.00 |

The results obtained using LPR and EIS measurements are presented in Tables 2 and 3.

TABLE 2

Linear polarization resistance (LPR) parameters for API 5L X60 steel in $CO_2$-saturated 3.5% NaCl without and with different inhibitor formulations at 50° C.

LPR method

| Concentration (ppm) | $R_p$ ($\Omega$ cm$^2$) | $C_R$ mpy | (%) Protection |
|---|---|---|---|
| Blank | 15.1 | 505.1 | — |
| Commercial Inh. | 37.2 | 204.6 | 59.4 |
| Formulation A | 776.1 | 9.8 | 98.1 |
| Formulation D | 199.2 | 38.2 | 92.4 |

TABLE 3

Impedance parameters for API 5L X60 steel in $CO_2$-saturated 3.5% NaCl without and with different inhibitor formulations at 50° C.

(a)

| System | $R_s$ ($\Omega$ cm$^2$) | Yo ($\Omega_s^n$ cm$^{-2}$ × $10^{-3}$) | n | $R_{ct}$ ($\Omega$ cm$^2$) | LH | $R_L$ ($\Omega$ cm$^2$) | $R_p$ ($\Omega$ cm$^2$) | $\chi^2$ × $10^{-4}$ | (%) Protection |
|---|---|---|---|---|---|---|---|---|---|
| Blank | 1.99 | 7.5 | 0.71 | 13.1 | 6.2 | 5.1 | 18.1 | 2.2 | — |
| Commercial Inh. | 1.68 | 3.2 | 0.69 | 34.1 | 11.9 | 15.2 | 49.3 | 10.9 | 62.9 |

(b)

| System | $R_s$ ($\Omega$ cm$^2$) | CPE$_f$ Yo ($\Omega_s^n$ cm$^{-2}$ × $10^{-3}$) | n | $R_f$ ($\Omega$ cm$^2$) | CPE$_{dl}$ Yo ($\Omega_s^n$ cm$^{-2}$ × $10^{-3}$) | n | $R_{ct}$ ($\Omega$ cm$^2$) | $R_p$ ($\Omega$ cm$^2$) | $\chi^2$ × $10^{-4}$ | (%) Protection |
|---|---|---|---|---|---|---|---|---|---|---|
| Formulation A | 2.66 | 2.1 | 0.62 | 690.7 | 11.3 | 0.57 | 1.05 × 10$^6$ | 1.06 × 10$^6$ | 28.6 | 99.9 |
| Formulation D | 1.76 | 0.3 | 0.88 | 49.3 | 2.7 | 0.54 | 133.8 | 183.1 | 3.7 | 89.3 |

The results obtained in the Tables confirmed the effectiveness of Formulation A and Formulation D as corrosion inhibitors. When compared to the commercially available imidazoline formulation, the formulation according to the invention exhibited excellent protection performance of API 5L X60 steel (Formulation A=98.1%, LPR; Formulation D=92.4%, LPR) than the commercial inhibitor (Commercial Inh.=59.4%, LPR) even when applied at a low concentration of 50 ppm.

Embodiments

The following description of technology is merely exemplary in nature of the subject matter, manufacture and use of one or more inventions, and is not intended to limit the scope, application, or uses of any specific invention claimed in this application or in such other applications as may be filed claiming priority to this application, or patents issuing therefrom. Non-limited embodiments of the invention include the following.

An azole composition comprising: 0.01 to 5.00 wt % of at least one azole, 0.01 to 1 wt % of at least one polypeptide, and 0.0015 to 0.01% of at least one surfactant, 0.1 to 0.5 wt. % of at least one metal halide; and water or an aqueous solution or buffer; wherein the at least one azole has the formula:

wherein R1 is a thiol group, NH-substituted group, carboxylate group, amide group containing aromatic groups, pyridyl group, azo group, nitrile group, methylthio group, 2-piperazino group, 2-bromophenyl group, sulfonic acid group, mercapto group; and wherein R2 is a carboxylate group, thiol group, aromatic carbonyl group, hydroxy group, methyl amino group, amide group, or ester group; and wherein the at least one polypeptide has the formula:

wherein R4, R5 and R6 are independently alkyl groups.

In some embodiments the azole will contain thiol substituents at R1 or R2 or both R1 and R2. In other embodiments, the azole will not have any thiol substituents.

In some embodiments the azole will contain mercapto substituents at R1. In other embodiments, the azole will not have any mercapto substituents.

In some embodiments the azole will contain methylthio substituents at R1. In other embodiments, the azole will not have any methylthio substituents.

In some embodiments, none of the R1 or R2 substituents on the azole or the R4, R5 or R6 substituents on polypeptide will contain more than 1 or 2 carbon atoms. In other embodiments, neither the azole nor polypeptide will contain alkyl substituents longer than C1 or C2. Longer chain alkyl substitutes which can render the benzimidazole toxic or insoluble in the aqueous phase are to be avoided in the disclosed benzimidazole structure as they can interfere with the solubility of the glutathione-like polypeptide and the metal iodide.

The inventors found that benzimidazoled containing no alkyl group as substituent in the ring and special polar group at the R1 and R2 positions gave excellent anticorrosive properties in combination with polypeptide derived from glutathione and metal iodide salts. The combinations were effective at 50 ppm and can protect metals against oilfield brine corrosion even in high turbulent flow condition.

In some embodiments the substituents at one or both of positions R1 or R2 are thiol groups, especially thiol groups that do not reduce the water solubility of the azole or make it substantially not soluble in water compared to an otherwise identical not substituted azole.

In some embodiments the substituents at one or both of positions R1 or R2 are carboxylate groups, especially carboxylate groups that do not reduce the water solubility of the azole or make it substantially not soluble in water compared to an otherwise identical not substituted azole.

In other embodiments one substituent at positions R1 or R2 is a thiol group and the other a carboxylate group, especially groups that do not reduce the water solubility of the azole or make it substantially not soluble in water compared to an otherwise identical not substituted azole.

In some embodiments, this composition may be formulated without water or an aqueous solution or buffer, for example, when formulated in an anhydrous or concentrated form for subsequent reconstitution. The components of this composition may be contained in separate containers and mixed or introduced into water or an aqueous solution to produce the composition.

One embodiment of the azole composition of the invention contains a benzimidazole according to the formula in the embodiment above, glutathione, sodium iodide, cetyl trimethyl ammonium bromide, water and alcohol (ethanol). Specific embodiments include Formulation A as described in Table 1 below. Comparative Formulation D does not contain a polypeptide according to the invention.

The azole composition as described herein may contain at least one surfactant that is a quaternary ammonium surfactant, such as cetyl trimethyl ammonium bromide or it may contain a polysorbate surfactant such as TWEEN 80, a linear alcohol ethoxylate, ethylene glycol and/or propylene glycol.

The azole composition of the invention preferably is non-toxic as characterized by an acute or long-term LD50 of more than 5,000 mg/kg body weight of an animal such as a laboratory mouse (e.g., BALB/C; CD1), rat (e.g., Sprague Dawley, Wistar) or rabbit (e.g., NZ White). It preferably is non-toxic as characterized on aquatic plant or animal species or on human cells in culture by an LC50 of more than 100, 200, 300, 400, or 500 mg/L.

The combination of a particular benzimidazole according to the invention containing the disclosed substitutions at R1 and R2, such as a carboxylate group and water soluble thiol groups, the particular polypeptides, such as glutathione and its derivatives, and a metal halide, such as a metal iodide, provide a superior anticorrosive effects, such as excellent anticorrosive performance against oilfield brine metal corrosion, even at concentrations of 50 ppm. In preferred embodiments, the combination of a benzimidizole, polypeptide and surfactant according to the invention provides green, water soluble surfactant exhibiting unique properties such as high solubility and diffusion, high adsorption to the metal surface, and high anticorrosive performance at low concentration, for example, at a concentration of 50 ppm.

In another embodiment, the invention is directed to a composition of matter comprising one or more metals in contact with an azole-containing composition of the invention. These metals may be ferrous metals, such as steel or stainless steel or other metals subject to corrosion. The composition of matter may constitute a metal immersed or partially immersed in the azole-containing composition, or a metal having a surface coated, wiped, sprayed, painted or otherwise contacted with the azole-containing composition.

In another embodiment the azole-containing composition may be incorporated into solid, semi-solid, liquid or gaseous product or substance, for example, into a petroleum product containing a corrosive component such as $H_2O$, $H^+$, $CO_2$, $H_2S$, and $Cl^-$ that comes into contact with a corrodible metal or alloy. Coolants, fuels, lubricants, hydraulic fluids, boiler water, engine oil, and other industrial fluids may contain the azole containing composition of the invention, for example, to replace toxic corrosion inhibitors conventionally used in these fluids.

A method for inhibiting corrosion of a metal in the presence of water comprising contacting the metal with an azole composition as described herein or with a fluid, mud or other substance into which the azole composition has been incorporated. The metal may be a ferrous metal or ferrous metal alloy. It may be a low carbon or mild steel containing up to 0.5% carbon; a medium carbon steel containing 0.3 to 0.6% carbon; or a high carbon steel containing more than 0.6% carbon. It may be stainless steel or another type of steel as described herein. The metal may be a tool, equipment, supply or part of a system of drilling, pumping, extracting or otherwise obtaining a petroleum product such as oil or natural gas or a system for processing, refining, holding, or transporting such a product.

This method involves contacting the metal with an azole composition as disclosed herein at a concentration sufficient to prevent or inhibit corrosion, such as at least 5, 10, 15, 20, 25, 30, 35, 40, 45, 50, 55, 60, 65, 70, 75, 80, 85, 90, 100, 150, 200, 250, 300, 350, 400, 450, 500, 1,000, 2,000 ppm of an azole composition according to the invention.

This method may comprise incorporating the azole composition into a petroleum product or other fluid prior to or during contact with a corrodible metal. It may be applied to prevent corrosion of elements in a system that produces, transports or refines a petroleum product. In some embodiments, the concentration of azole, surfactant, and/or metal halide in a petroleum product, brine or other fluid in contact with corrodible metal will range from 1 to 1,000 ppm or more, including 1, 2, 5, 10, 20, 50, 100, 200, 300, 400, 500, 600, 700, 800, 900, or 1,000 ppm or more and any intermediate value or subrange.

In advantageous embodiments the system will not produce or emit waste products comprising a toxic amount or concentration of said azole.

Terminoloay

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/".

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "substantially", "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), +/−20% of the stated value (or range of values), etc. Any numerical range recited herein is intended to include all sub-ranges subsumed therein.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

The headings (such as "Background" and "Summary") and sub-headings used herein are intended only for general organization of topics within the present invention, and are not intended to limit the disclosure of the present invention or any aspect thereof. In particular, subject matter disclosed in the "Background" may include novel technology and may not constitute a recitation of prior art. Subject matter disclosed in the "Summary" is not an exhaustive or complete disclosure of the entire scope of the technology or any embodiments thereof. Classification or discussion of a material within a section of this specification as having a particular utility is made for convenience, and no inference should be drawn that the material must necessarily or solely function in accordance with its classification herein when it is used in any given composition.

As used herein, the words "preferred" and "preferably" refer to embodiments of the technology that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the technology.

As referred to herein, all compositional percentages are by weight of the total composition, unless otherwise specified. As used herein, the word "include," and its variants, is intended to be non-limiting, such that recitation of items in a list is not to the exclusion of other like items that may also be useful in the materials, compositions, devices, and methods of this technology. Similarly, the terms "can" and "may" and their variants are intended to be non-limiting, such that recitation that an embodiment can or may comprise certain elements or features does not exclude other embodiments of the present invention that do not contain those elements or features.

Disclosure of values and ranges of values for specific parameters (such as temperatures, molecular weights, weight percentages, etc.) are not exclusive of other values and ranges of values useful herein. It is envisioned that two or more specific exemplified values for a given parameter may define endpoints for a range of values that may be claimed for the parameter. For example, if Parameter X is exemplified herein to have value A and also exemplified to have value Z, it is envisioned that parameter X may have a range of values from about A to about Z. Similarly, it is envisioned that disclosure of two or more ranges of values for a parameter (whether such ranges are nested, overlapping or distinct) subsume all possible combination of ranges for the value that might be claimed using endpoints of the disclosed ranges. For example, if parameter X is exemplified herein to have values in the range of 1-10 it is also envisioned that Parameter X may have other ranges of values including 1-9, 2-9, 3-8, 1-8, 1-3, 1-2, 2-10, 2.5-7.8, 2-8, 2-3, 3-10, and 3-9, as mere examples.

Although the open-ended term "comprising," as a synonym of terms such as including, containing, or having, is use herein to describe and claim the present invention, the invention, or embodiments thereof, may alternatively be described using more limiting terms such as "consisting of" or "consisting essentially of" the recited ingredients. Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that logical compositional substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

INCORPORATION BY REFERENCE

All publications and patent applications mentioned in this specification are herein incorporated by reference in their entirety to the same extent as if each individual publication or patent application was specifically and individually indicated to be incorporated by reference, especially referenced is disclosure appearing in the same sentence, paragraph, page or section of the specification in which the incorporation by reference appears. The citation of references herein does not constitute an admission that those references are prior art or have any relevance to the patentability of the technology disclosed herein. Any discussion of the content of references cited is intended merely to provide a general summary of assertions made by the authors of the references, and does not constitute an admission as to the accuracy of the content of such references.

The invention claimed is:

1. A method for inhibiting corrosion of a metal or alloy in the presence of water or other corrosive agent comprising contacting the metal or alloy with a benzimidazole composition, comprising:
   0.01 to 5.00 wt % of at least one benzimidazole,
   0.01 to 1 wt % of glutathione,
   0.0015 to 0.01 wt % of at least one surfactant,
   0.1 to 0.5 wt % of at least one metal iodide; and
   water;
   wherein the at least one benzimidazole has the formula:

wherein R1 is a thiol group, amine group, a substituted amine group, methylamine, ethylamine or another amine-bearing group, carboxylate group, amide group containing an aromatic group, pyridyl group, azo group, nitrile group, methylthio group, 2-piperazino group, 2-bromophenyl group, sulfonic acid group, or a mercapto group and wherein R2 is a carboxylate group, thiol group, an aromatic carbonyl group, hydroxy group, methyl amino group, amide group, or ester group; and
   wherein R2 is optionally an aromatic carbonyl group which comprises an alkyl benzyl carbonyl group having the general structure below and wherein R3 is $C_1$-$C_3$ alkyl;

2. The method of claim 1, wherein the metal or alloy is low carbon or mild steel containing up to 0.3% carbon.

3. The method of claim 1, wherein the metal or alloy is a medium carbon steel containing 0.3 to 0.6% carbon.

4. The method of claim 1, wherein the metal or alloy is a high carbon steel containing more than 0.6% carbon.

5. The method of claim 1, wherein the metal or alloy is a stainless steel.

6. The method of claim 1, wherein the metal or alloy is contacted with a concentration of 10 to 100 ppm of the benzimidazole composition.

7. The method of claim 1, wherein the metal or alloy is part of a system for oil or gas production, transport, or refining.

8. The method of claim 1, further comprising incorporating the benzimidazole composition into a petroleum product or a solution containing a petroleum product.

9. The method of claim 1, further comprising contacting a system that produces, transports or refines a petroleum product with the benzimidazole composition.

10. The method of claim 1, further comprising contacting a system that produces, transports or refines a petroleum product with the benzimidazole composition; wherein said system does not produce waste products comprising a toxic amount or concentration of said composition.

* * * * *